(12) United States Patent
Yasrebi et al.

(10) Patent No.: US 9,215,203 B2
(45) Date of Patent: *Dec. 15, 2015

(54) SYSTEM AND METHOD FOR EFFICIENT UNIFIED MESSAGING SYSTEM SUPPORT FOR SPEECH-TO-TEXT SERVICE

(71) Applicant: AT&T Intellectual Property I, L.P., Atlanta, GA (US)

(72) Inventors: Mehrad Yasrebi, Austin, TX (US); James Jackson, Austin, TX (US); John E. Lemay, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,181

(22) Filed: Sep. 24, 2013

(65) Prior Publication Data

US 2014/0025764 A1    Jan. 23, 2014

Related U.S. Application Data

(63) Continuation of application No. 12/841,830, filed on Jul. 22, 2010, now Pat. No. 8,543,652.

(51) Int. Cl.
*G06F 15/16* (2006.01)
*H04L 12/58* (2006.01)
*G10L 15/26* (2006.01)

(52) U.S. Cl.
CPC ............... *H04L 51/34* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,580,786 B1 | 6/2003 | Yarlagadda | |
| 6,816,858 B1 | 11/2004 | Coden et al. | |
| 7,024,455 B2 | 4/2006 | Yokobori et al. | |
| 8,442,958 B2 * | 5/2013 | Bose et al. | 707/694 |
| 8,543,652 B2 * | 9/2013 | Yasrebi et al. | 709/206 |
| 2003/0169865 A1 | 9/2003 | Oren | |
| 2003/0236845 A1 | 12/2003 | Pitsos | |
| 2004/0044749 A1 | 3/2004 | Harkin | |
| 2004/0083270 A1 | 4/2004 | Heckerman et al. | |
| 2004/0248563 A1 | 12/2004 | Ayers et al. | |
| 2007/0287463 A1 | 12/2007 | Wilson | |
| 2009/0061828 A1 | 3/2009 | Sigmund et al. | |
| 2009/0164588 A1 | 6/2009 | D'Amato et al. | |

(Continued)

FOREIGN PATENT DOCUMENTS

| | | |
|---|---|---|
| JP | 02069043 | 3/1990 |
| JP | 2009245374 | 10/2009 |
| WO | 9719525 | 5/1997 |

*Primary Examiner* — John B Walsh

(57) ABSTRACT

Disclosed herein are systems, methods, and non-transitory computer-readable storage media for communicating information about transcription progress from a unified messaging (UM) server to a UM client. In one embodiment, the transcription progress describes speech to text transcription of speech messages such as voicemail. The UM server authenticates and establishes a session with a UM client, then receives a get message list request from a UM client as of a first time, responds to the get message list request with a view of a state of messages and available transcriptions for transcribable messages in a list of messages associated with the get message list call at the first time, and, at a second time subsequent to the first time, transmits to the UM client a notification that provides an indication of progress for at least one transcription not yet complete in the list of messages. The messages can include video.

18 Claims, 5 Drawing Sheets

(56) References Cited

U.S. PATENT DOCUMENTS

| | | |
|---|---|---|
| 2009/0164933 A1 | 6/2009 | Pederson et al. |
| 2010/0125450 A1 | 5/2010 | Michaelangelo et al. |
| 2010/0146057 A1 | 6/2010 | Abu-Hakima et al. |
| 2010/0150322 A1 | 6/2010 | Yin et al. |
| 2011/0022387 A1* | 1/2011 | Hager ............................ 704/235 |
| 2012/0023173 A1 | 1/2012 | Jackson et al. |
| 2012/0033794 A1 | 2/2012 | Jackson et al. |
| 2012/0278160 A1 | 11/2012 | Ieong et al. |

* cited by examiner

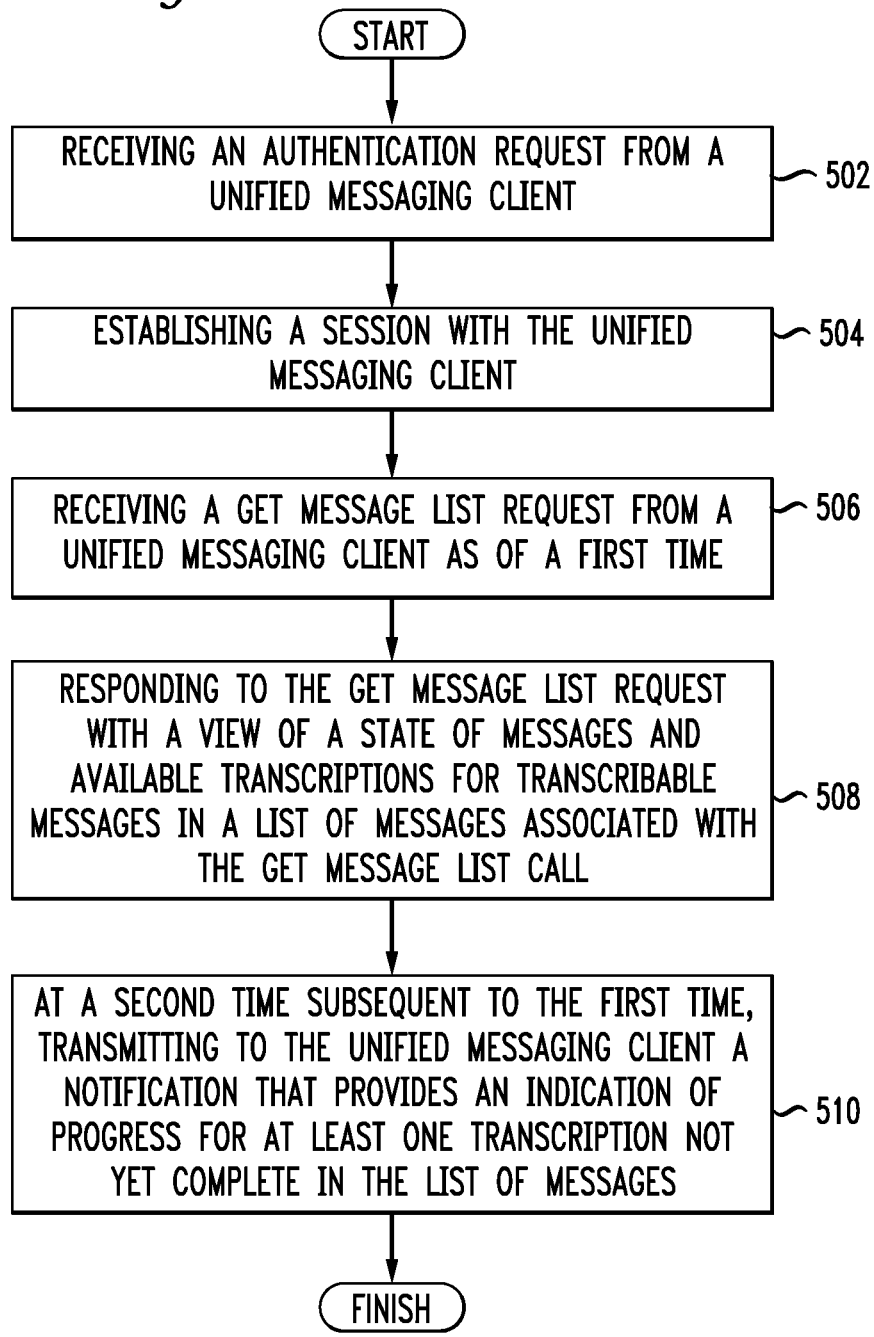

SYSTEM AND METHOD FOR EFFICIENT UNIFIED MESSAGING SYSTEM SUPPORT FOR SPEECH-TO-TEXT SERVICE

PRIORITY INFORMATION

The present application is a continuation of U.S. patent application Ser. No. 12/841,830, filed Jul. 22, 2010, the content of which is incorporated by reference in its entirety.

BACKGROUND

1. Technical Field

The present disclosure relates to unified messaging and more specifically to more efficient use of unified messaging system resources.

2. Introduction

Unified messaging (UM) is an approach to integrate messages which are created and transmitted via different communication media into a single interface which is accessible from a wide array of devices. For example, a unified messaging interface can be accessible via desktop or laptop computer, a web interface, smart phone, cellular phone, landline phone, and so forth. In one aspect, different client devices must periodically poll a UM server to inquire about availability of transcribed text which was not available earlier. The polling interval of a great number of client devices is not sensitive to the overall load, availability, or other dynamic characteristics of the STT engine or the UM servers. The polling utilizes network bandwidth and server resources inefficiently, unnecessarily, and unintelligently.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure involves fault-tolerant modifications to a unified messaging (UM) system to efficiently manage the Speech-To-Text (STT) capability between an STT engine or other transcription service and various client applications. Occasionally, the STT engine may experience delays, service disruptions, and errors, but client applications must not be forced to wait unnecessarily long times for accessing the original non-text content. The non-text content can be, for example, a received voicemail, video mail, image, audiovisual presentation, or facsimile (fax).

In one aspect, the approach set forth herein includes three steps. The first step is dynamic computation by the UM system of estimated delays until the transcribed text is available using any one of suitable algorithms. The second step is to communicate the estimated delays to UM clients when the clients receive information about the deposited originally received non-text message. The third step is to use one or more asynchronous notification channels to inform the UM clients with pre-existing current sessions of the availability of the transcribed text for specific non-text content that was deposited in the mailbox earlier. This approach is fault tolerant in that it results in desired efficiencies even if one or more asynchronous notification channels are broken (such as when the notification servers or recipient servers fail). This approach reduces the cost to the UM system and the clients by reducing the numbers of Application Programming Interface (API) calls and the need for associated capacities. This approach also improves the expected response time to users, which is especially important in systems servicing millions of UM clients, many of whom communicate with the UM system concurrently. This approach is also adaptable in that any suitable algorithm or method can be used to reduce the wait times of the UM clients and improve the responsiveness of the UM system.

Disclosed are systems, methods, and non-transitory computer-readable storage media for communicating information about transcription progress at a unified messaging (UM) server. The UM server receives an authentication request from a unified messaging client and establishes a session with the unified messaging client based on the authentication request. Then the UM server receives a get message list request from a UM client as of a first time, and responds to the get message list request with a view of a state of messages and available transcriptions for transcribable messages in a list of messages associated with the get message list call at the first time. Then the UM server transmits to the UM client, at a second time subsequent to the first time, a notification that provides an indication of progress for at least one transcription not yet complete in the list of messages. The UM server can send the notification via an asynchronous notification channel. The message can be a non-text message, an audio message, or a video message, for example. All or part of a visual message can be transcribed via optical character recognition (OCR).

The UM server can generate the indication of progress based on at least one of current load on a transcription server such as an STT engine, historic response times from the transcription server, length of an original message, current load on the UM server, and expected time of availability of transcription server if the transcription server is unavailable. If the transcription server is unavailable, the indication of progress can further be based on an average transcription server recovery time. If a transcription for a given message has already started, the indication of progress for that message can be based on observed processing time to transcribe messages of similar size to the given message, the length of the given message, an amount of time since the given message was submitted for transcription, and/or an estimated setup time, which may be fixed or dynamically computed. If a transcription for a given message has not already started, the indication of progress for that message can be based on observed processing time to transcribe messages of similar size to the given message and an estimated setup time.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved notification of transcriptions in a unified messaging (UM) system. A system, method and non-transitory computer-readable media are disclosed which communicate information about transcription progress to UM clients. A brief introductory description of a basic general purpose system or computing device in FIG. 1 which can be employed to practice the concepts is disclosed herein. A more detailed description of an exemplary UM server/client configuration, a UM client graphical user interface, a timeline of communications between a UM server, UM client, and transcription server, and an exemplary method will then follow. The disclosure now turns to FIG. 1.

Figure 1:
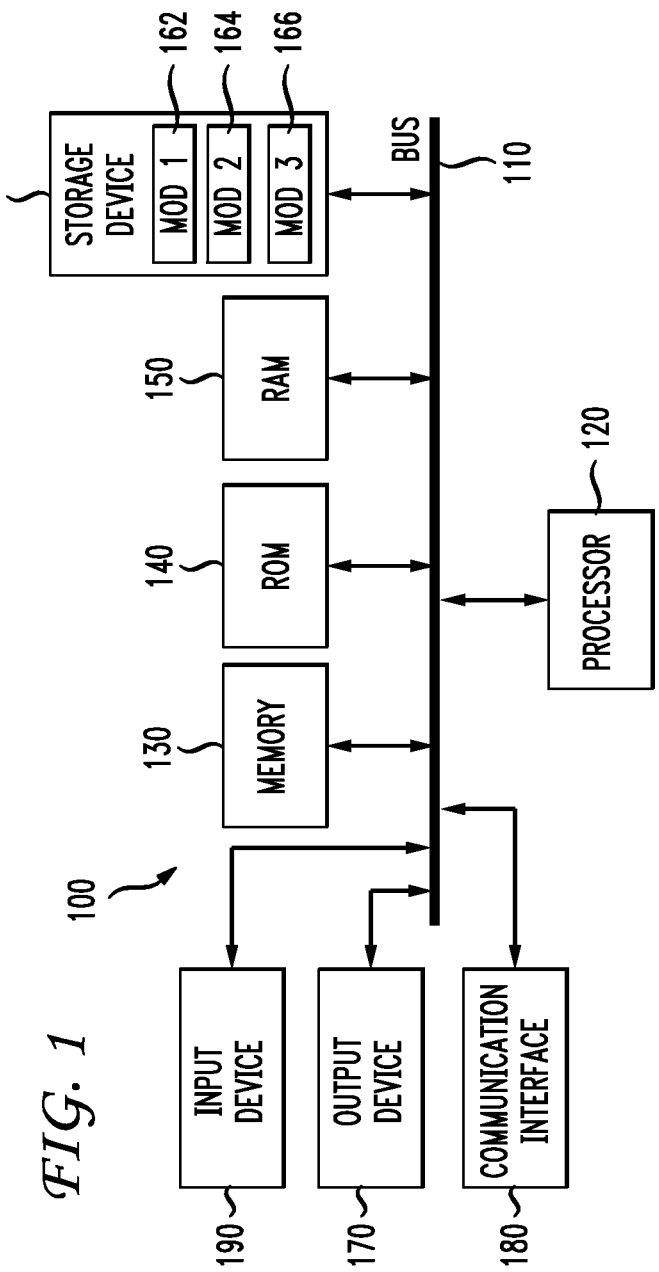
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
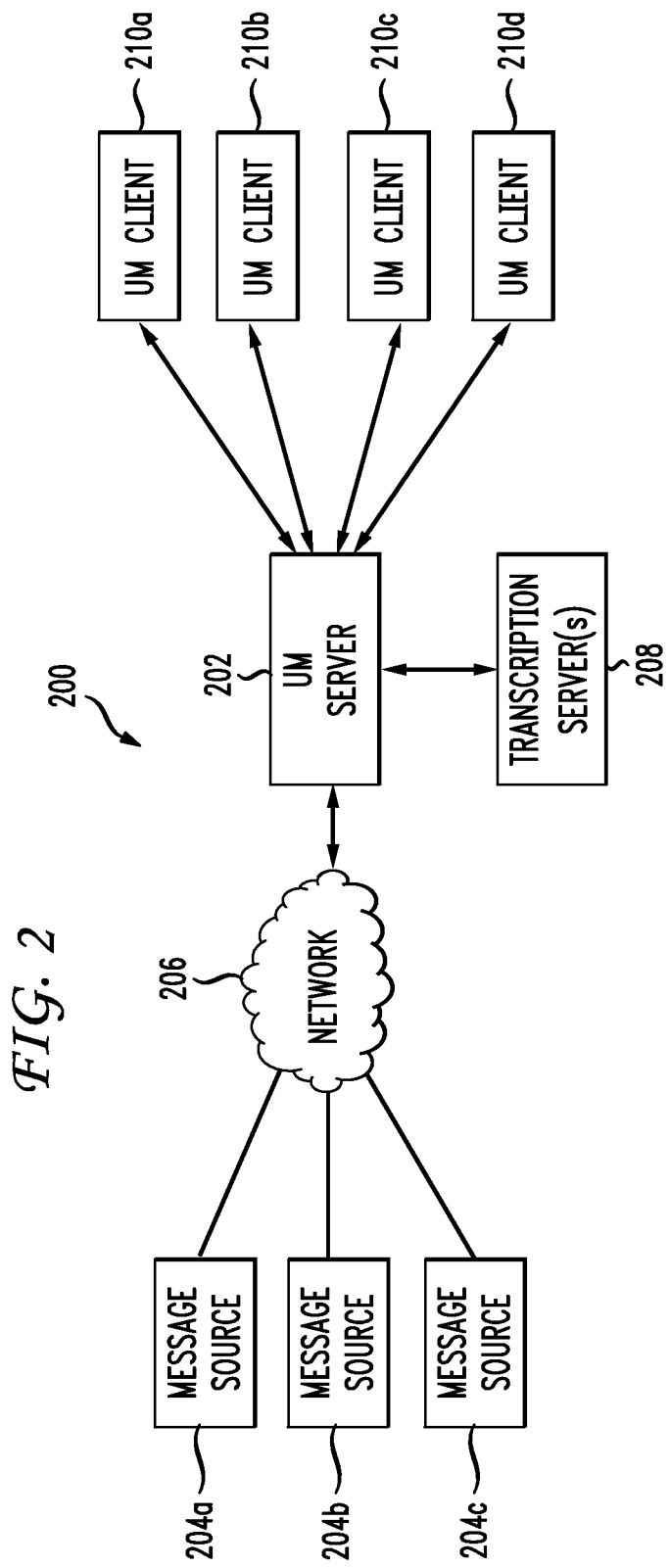
FIG. 2 illustrates an example unified messaging (UM) server and UM client configuration.

Having disclosed some exemplary system components, the disclosure now turns to FIG. 2 which illustrates an example overview 200 of a unified messaging (UM) server 202 and UM client 210a,b,c,d configuration. The UM server 202 and/or UM clients 210a,b,c,d can include all or part of the elements of the exemplary system 100 shown in FIG. 1. The UM server 202 receives messages from multiple message sources 204a, 204b, 204c via a communication network 206, such as the public switched telephone network or the Internet. The message sources can provide message such as voicemails, video messages, faxes, images, multimedia messages, and/or hyperlinks.

The UM server 202 communicates with a transcription server 208 or servers which transcribe all or part of each message from the message sources. The transcription server 208 can transcribe using speech to text, OCR, pattern recognition, and/or any other suitable mechanism(s) to extract text from non-textually formatted messages. The transcription server 208 can also perform translation services to translate extracted text from one language to another, if needed. The UM server 202 can then offer an original language transcription and, optionally, a translated transcription to the UM client. The UM server 202 identifies a particular UM client 210a,b,c,d for each message and transmits information to the respective UM client regarding the message, including a transcription status. For example, in the case of a voicemail, the UM server 202 can transmit information indicating a sender of the voicemail, a duration of the voicemail, a callback number, a time of the voicemail, a "headline" of the voicemail transcription, an expected completion time for the transcription if it is not yet completed, and so forth.

Some example UM clients include smartphones, PDAs, cellular phones, web browsers, mobile phone applications, a personal computer, an intermediate UM server, an IPTV set top box, and so forth. When a UM client establishes a session with the UM server 202, the UM server 202 can return a listing of messages and transcription progress for messages in the listing. If the UM server 202 receives progress updates, such as a revised expected completion time or a completed transcription, from the transcription server 208, the UM server 202 can transmit updated notifications to the appropriate UM client via an asynchronous notification channel.

In one aspect, an existing notification channel between the UM server 202 and the UM clients 210a,b,c,d can be enhanced (1) to include a new message type that indicates availabilities of one or more transcriptions, (2) to include references to the existing non-text messages for each newly-available transcription in each such message, and (3) to issue instances of this new notification message Application Programming Interface (API) call to notification servers and/or directly to the UM clients.

In an embodiment, the UM server 202 sends instances of this new notification message type when at least one existing session exists on a UM client for that mailbox. One example of a session in a web UM interface is a duration that the web UM interface is open and active in a web browser. Another example of a session in a smartphone is as long as the smartphone has an active data connection, whether by cellular signals, USB cable, wifi, or other wired or wireless link. When a user logs into UM for a mailbox using a UM client, the UM client initially issues a fresh getMessageList( ) API call to the UM server 202 to receive a current view of the state of messages (voicemail, videomail, faxes, emails, and so forth) and transcriptions on that mailbox. Subsequent asynchronous notifications for the logged-in user can update the states for existing messages in his/her mailbox message list. The UM server 202 can update states to indicate that a message is newly available, a new message has arrived, the expected completion time for a transcription has changed, and so forth. In this way, the UM server 202 pushes updates to the appropriate UM clients 210a,b,c,d as information becomes available and the UM clients 210a,b,c,d are not required to constantly poll the UM server 202 for updated information. In one variation, the UM server 202 sends groups of notification messages to notifications servers of UM clients every N seconds to save bandwidth.

The UM server 202 can compute, using a suitable algorithm, a dynamic estimate time when the transcription for each message is expected to become available to the UM client(s). The algorithm can take a variety of parameters as input. Some exemplary parameters include current load on the transcription server 208, historic response time from the transcription server 208, the length of the transcribable portion of the non-text original message, the current load of the UM server 202, and the expected time for availability of the transcription server 208 if it is not currently available.

One example algorithm for computing an estimated completion time T in seconds for a message of size S seconds of audio is described below. If the transcription server 208 is unavailable, then T=average transcription server 208 service recovery time. Otherwise (if the transcription server 208 is available) and if the transcription for that message has already started, T={[(observed transcription server 208 turn-around latency time for messages of length N seconds during the last OT minutes) * ((S—amount of time since the transcription request was submitted to the transcription server 208)/N)]+[an estimated set-up and/or delay time DT (aggregated to account for set-up and other delays on the UM server 202 and/or the transcription server 208)]}. Otherwise (if the transcription server 208 is available) and if the transcription for that message has not yet started, then T={[(observed transcription server 208 turn-around latency time for messages of length N seconds during the last OT minutes) * (S/N)]+[an estimated set-up and/or delay time DT (aggregated to account for set-up and other delays on the UM server 202 and/or the transcription server 208)]}. The estimated set-up and/or delay time DT can be fixed, dynamically, or randomly determined. For example, DT can be a randomized variable with a mean of 20 seconds. In one aspect, DT is randomized with a pre-configured mean or a constant value. One example value for OT is 30 minutes. One example value for N is 5 seconds. The system 200 can use other algorithms, values, variables, and sets of conditions to determine the estimated completion time T.

Figure 3:
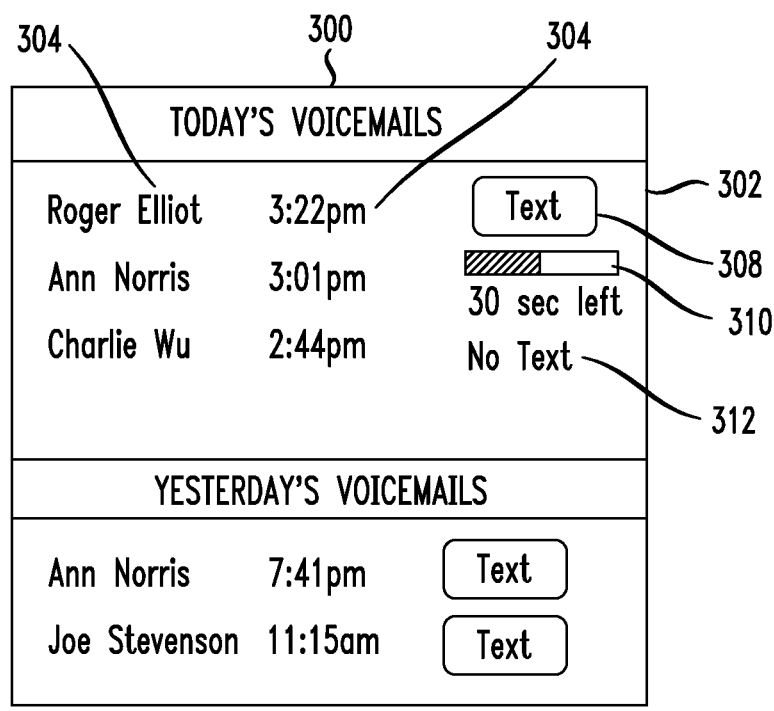
FIG. 3 illustrates an example UM client interface for browsing messages.

FIG. 3 illustrates an example UM client interface 300 for browsing messages on a mobile phone or similar device. Before discussing this client interface 300, a set of exemplary steps are reviewed which lead to this UM client interface 300.

A user logs in to establish a session. The user can log in automatically or manually by entering a username and password on a user device, for example. The UM client sends a getMessageList( ) API call to the UM server, which returns a list of messages, some of which may not have completed transcriptions. The user device shows a listing of the messages received from the UM server. In this example, each message can include a name 304 (or some other indicator such as a telephone number) of the person that left the message, a time 304 the message was left, and an indication of the message's status. One indication is a text button 308 indicating that transcribed text of the message is available to the user via the UM client. Another indication is a progress bar 310 indicating current progress and/or an expected completion time, i.e. 30 seconds left. Such an "in progress" indication can take numerous other forms. For example, the indication can be an expected completion time such as 4:10 pm, a live count of how many words are already transcribed, an animation of a text document being assembled piece by piece, an icon, an action link, etc. Another indication is "no text" 312. This indication can mean that no transcription has started, no estimated time has been set for the transcription, transcription is unavailable for that message type, the message is still being received from the message source, and/or other reasons for unavailability.

The UM client can dynamically update indications 310, 312 for messages which do not have a complete transcription based on relevant information as information about the transcription may become available. The UM client can change the animation, icon, action link, or other indication to indicate that transcription is complete. The UM client can also provide an audible or visible notification of a newly completed transcription. For example, if the transcription server goes down then the estimated completion time increases based on some average duration for the transcription workload to shift to another server or for the transcription server to go back online. In an enhanced notifications interface, for each message the UM client receives a message Unique Identifier (UID) as part of the notification about the transcriptions or more messages as status changes about the transcriptions for each un-transcribed message may become available. In one example, a powerful transcription server capable of transcribing messages very quickly goes down and the transcription work shifts to several backup transcription servers which operate much more slowly. This shift can trigger a change to a later time for the estimated completion time for transcriptions. This approach can update the display on UM clients in real time or in substantially real time to reflect the later estimated completion time.

Figure 4:
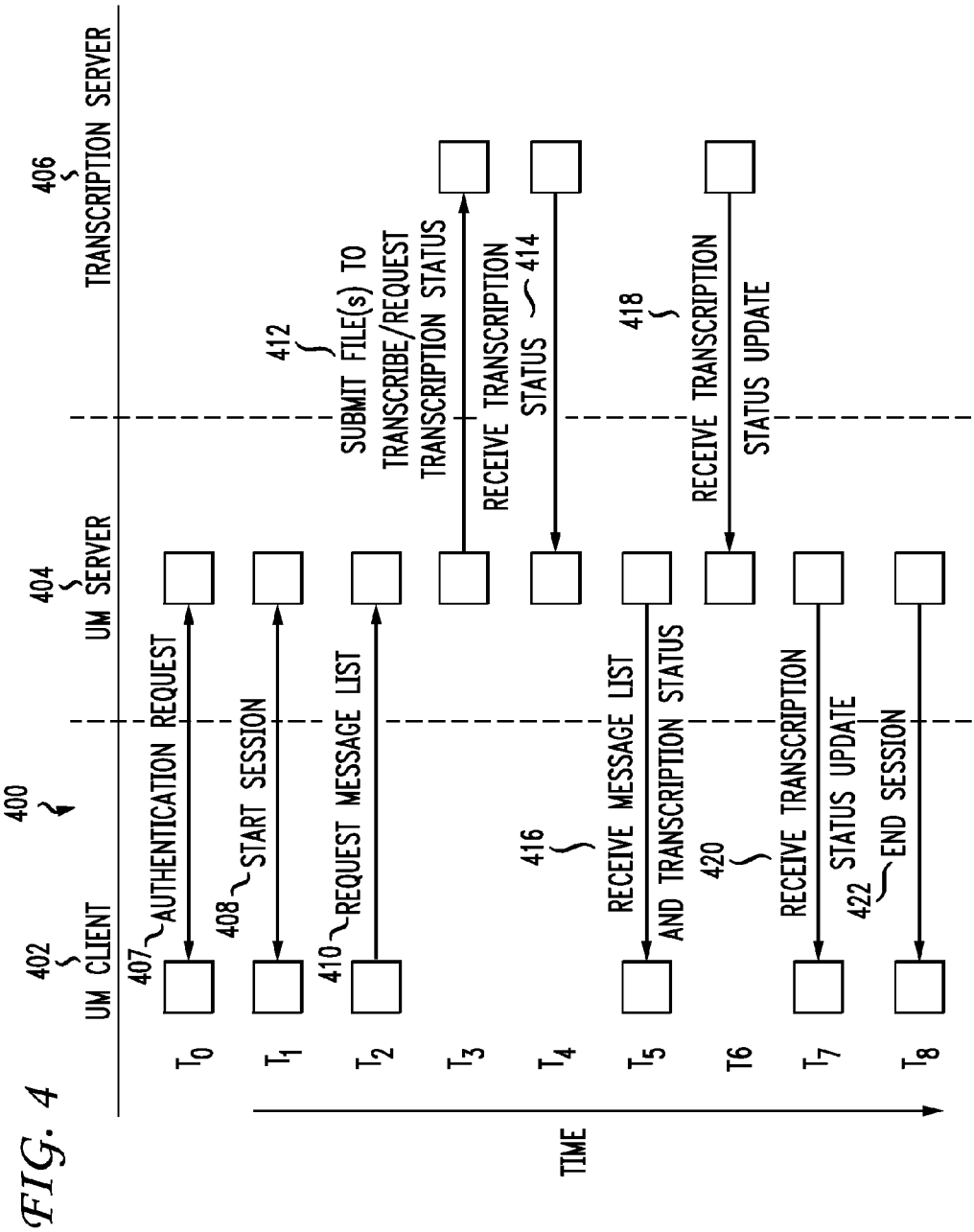
FIG. 4 illustrates a timeline of communication between a UM client, a UM server, and a transcription server.

FIG. 4 illustrates a timeline 400 of communications between a UM client 402, a UM server 404, and a transcription server 406. At time $T_0$ the UM client 402 sends an authentication request or logs in to the UM server 404 for a particular mailbox, and the UM server, at time $T_1$ initiates a session 408 with the UM client after authenticating and authorizing the UM client. At time $T_2$, the UM client 402 requests a list of messages 410 from the UM server 404. At time $T_3$, the UM server 404 can submit one or more files to be transcribed and/or request transcription status 412 from the transcription server 406 for at least a subset of messages in the message list requested from the UM client 402. In one embodiment, UM server 404 submits files to be transcribed to the transcription server 406 without waiting for a related inquiry from the UM client 402, such as after one or more audio file(s) are deposited into the mailbox. At time $T_4$, the UM server 404 can receive the transcription status 414 for one or more messages from the transcription server 406. In one embodiment, the transcription server 406 only provides a portion of the data the UM server 404 requires, from which the UM server 404 can estimate or predict a transcription status. At time $T_5$, the UM client 402 receives a message list and transcription status 416 from the UM server 404. The transcription status can include, for each message, states such as "complete", "not started", "in progress", "in progress" with an estimated completion time, "untranscribable", and so forth. The UM server 404 and/or the transcription server 406 can determine the transcription status for each message.

As the status for transcriptions changes, such as when the transcription server 406 completes a pending transcription, the UM server 404 receives a transcription status update 418 from the transcription server 406 at time $T_6$. At time $T_7$, the UM server 404 sends the transcription status update 420 to the UM client 402, which can then update its message interface to the user. In this approach, the UM client 402 does not need to constantly issue a new, potentially resource-intensive Application Programming Interface (API) method invocation to retrieve a list of various messages along with various information about such messages (e.g., using a getMessageList( ) API call) to the UM server 404, unless the UM client 402 receives an actual new message, receives other status update about a message (e.g., when a status is changed from has-been-read to has-not-been-read or vice of versa) or notices that an existing messages has been deleted. When the UM client 402 is done communicating with the UM server 404, the session ends 422 at time $T_8$. A session can end when a user closes a web browser, logs off a computer, turns off a mobile phone, or after a timeout duration, for example.

In some variations, media messages and corresponding transcriptions can reference one another. The UM server can implement referential integrity for such references. The transcription server can properly account for nested or forwarded messages. The messages for transcription can be in of extensible media types to support future message formats without changing the interface or syntax for interacting with the transcription server. In one aspect, UM client applications are not blocked indefinitely and unnecessarily awaiting transcriptions from the UM server. In another aspect, UM clients may not need to poll the UM server more frequently about transcription status change of UM messages. The UM server can return dynamically-computed wait times to UM clients to increase system efficiency and reduce unnecessary load on the UM server.

In one aspect, tagged and untagged transcriptions can include confidence scores for use by UM client applications. Tag management for transcriptions can be table-driven. The UM server and/or client can accommodate tags from transcription engines from different vendors. Tags can be nested such that recursion can be applied to transcribed messages and more complex data, such as embedded addresses, phone numbers, or email addresses.

Having disclosed some basic system components, the disclosure now turns to the exemplary method embodiment for communicating information about transcription progress, as shown in FIG. 5. For the sake of clarity, the method is discussed in terms of an exemplary system 100, as shown in FIG. 1, configured to practice the method. The system 100 can include a processor and various modules configured to control the processor to perform any or all of these steps. The system 100 receives an authentication or login request from a unified messaging client (502) and establishes a session with the unified messaging client (504). Then the system 100 receives a get message list request from a UM client as of a first time (506). The system 100 responds to the get message list request with a view of a state of messages and available transcriptions for transcribable messages in a list of messages associated with the get message list call (508). The messages can include non-text messages, audio messages, video messages, and so forth. One common application is unified voicemail, but other applications exist. Messages having a visual component can be transcribed, at least in part, via optical character recognition or other graphics-based text extraction approaches. Messages can be automatically translated if left in a language other than a recipient's preferred language. Information that is returned by the UM server to a UM client about each message can include estimated completion time for a transcription of that message, as described earlier.

The system 100 may transmit to the UM client, at a second time subsequent to the first time, a notification that provides an indication of progress for at least one transcription not yet complete in the list of messages (510). The indication of progress can be generated based on at least one of current load on a transcription server, historic response times from the transcription server, length of an original message, current load on the UM server, and/or expected time of availability of transcription server if the transcription server is unavailable. If the transcription server is unavailable, the indication of progress can also be based on the average transcription server recovery time. If a transcription for a given message has already started, the indication of progress for the given message can also be based on observed processing time to transcribe messages of similar size to the given message, the length of the given message, an amount of time since the given message was submitted for transcription, and an estimated setup time, which may be fixed or dynamically computed. If a transcription for a given message has not already started, the indication of progress for the given message can also be based on observed processing time to transcribe messages of similar size to the given message and an estimated setup time, which may be fixed or dynamically computed. The indication of progress can be an expected completion time.

In one aspect, the system 100 further receives updated information regarding progress for the at least one transcription not yet complete in the list of messages and transmits to the UM client an updated notification based on the updated information. One example of updated information is a completed transcription. Another example is a transcription failure.

The estimated completion time for a transcription can be a single point in time such as 4:20 pm, or a range of time such as between 4:18 pm and 4:23 pm. In one aspect, if a user is displeased with a current estimated completion time for a transcription, the user can select a "speed up" option that charges the user a fee, such as a micropayment, to expedite the transcription by bumping the transcription up in a queue, moving the transcription to a dedicated expedited request transcription server, or other approach. For example, the user can expedite a current transcription in exchange for slower service for one or more later transcriptions. In another option, a user can opt to speed up a transcription by accepting a lower confidence score in the transcribed text, thereby allowing the transcription server to transcribe less accurately in a shorter time.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. The principles herein can allow users to see transcriptions faster than they otherwise would while a service provider can incur less capital and ongoing recurring expenses for providing transcription service via the UM system. The principles herein provide a fault-tolerant approach that provides benefit even if the notifications of messages are lost, not delivered, or if the UM server and/or UM notification engine are experiencing difficulties. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving a get message list request for a list of messages at a first time;
   responding, via a physical processor, to the get message list request with a report comprising a state of available messages and available transcriptions, wherein the available transcriptions are associated with transcribed messages in the available messages;

calculating, via the physical processor, an indication of progress for an incomplete transcription of a message in the list of messages, wherein the indication of progress is based on a time since a start of transcription and an expected completion time, the expected completion time based on a current transcription rate of the physical processor, and wherein when the transcription of the message has not already started, the indication of progress for the message is based on (1) a processing time to transcribe messages assigned to a size category also assigned to the message and (2) an estimated setup time; and at a second time, subsequent to the first time, transmitting a response to the get message list request, the response comprising the indication of progress.

2. The method of claim 1, wherein the message comprises one of a non-text message, an audio message, and a video message.

3. The method of claim 2, wherein the video message is transcribed via optical character recognition.

4. The method of claim 1, wherein the indication of progress is further based on one of a load on a transcription server, a historic response time in transcribing messages, a length of an original message of which the message is a portion, and a load on a unified message server.

5. The method of claim 4, wherein when the transcription server is unavailable, the indication of progress is further based on an average transcription recovery time.

6. The method of claim 1, wherein the messages are transcribed by one of speech to text, optical character recognition, analysis of an image, and automatic translation from one language to another.

7. The method of claim 6, wherein the updated information is based on a completed transcription.

8. The method of claim 1, further comprising:
receiving updated information regarding progress of the transcription; and
transmitting an updated indication based on the updated information.

9. The method of claim 1, wherein the indication of progress is further based on an expected time of availability of a transcription server performing the transcription when the transcription server is unavailable.

10. A system comprising:
a processor; and
a computer-readable storage medium having instructions stored, which, when executed by the processor, cause the processor to perform operations comprising:
receiving a get message list request for a list of messages at a first time;
responding, via a physical processor, to the get message list request with a report comprising a state of available messages and available transcriptions, wherein the available transcriptions are associated with transcribed messages in the available messages;
calculating, via the physical processor, an indication of progress for an incomplete transcription of a message in the list of messages, wherein the indication of progress is based on a time since a start of transcription and an expected completion time, the expected completion time based on a current transcription rate of the physical processor, and wherein when the transcription of the message has not already started, the indication of progress for the message is based on (1) a processing time to transcribe messages assigned to a size category also assigned to the message and (2) an estimated setup time; and
at a second time, subsequent to the first time, transmitting a response to the get message list request, the response comprising the indication of progress.

11. The system of claim 10, wherein the message comprises one of a non-text message, an audio message, and a video message.

12. The system of claim 10, wherein the video message is transcribed via optical character recognition.

13. The system of claim 10, wherein the indication of progress is further based on one of a load on a transcription server, a historic response time in transcribing messages, a length of an original message of which the message is a portion, and a load on a unified message server.

14. The system of claim 13, wherein when the transcription server is unavailable, the indication of progress is further based on an average transcription recovery time.

15. A computer-readable storage device having instructions stored which, when executed by a computing device, cause the computing device to perform operations comprising:
receiving a get message list request for a list of messages at a first time;
responding, via a physical processor, to the get message list request with a report comprising a state of available messages and available transcriptions, wherein the available transcriptions are associated with transcribed messages in the available messages;
calculating, via the physical processor, an indication of progress for an incomplete transcription of a message in the list of messages, wherein the indication of progress is based on a time since a start of transcription and an expected completion time, the expected completion time based on a current transcription rate of the physical processor, and wherein when the transcription of the message has not already started, the indication of progress for the message is based on (1) a processing time to transcribe messages assigned to a size category also assigned to the message and (2) an estimated setup time; and
at a second time, subsequent to the first time, transmitting a response to the get message list request, the response comprising the indication of progress.

16. The computer-readable storage device of claim 15, wherein the message comprises one of a non-text message, an audio message, and a video message.

17. The computer-readable storage device of claim 15, wherein the video message is transcribed via optical character recognition.

18. The computer-readable storage device of claim 15, wherein the indication of progress is further based on one of a load on a transcription server performing the transcription, a historic response time in transcribing messages, a length of an original message of which the message is a portion, and a load on a unified message server.

* * * * *